United States Patent [19]

Thompson et al.

[11] Patent Number: 5,467,587

[45] Date of Patent: Nov. 21, 1995

[54] SUNFLOWER HARVESTING ATTACHMENT FOR CORN PICKER HEADS

[76] Inventors: Daniel L. Thompson, Rural Rte. 1, Box 35; W. Dale Thompson, Rural Rte. 1, Box 30, both of Clifford, N. Dak.

[21] Appl. No.: 327,500

[22] Filed: Oct. 21, 1994

[51] Int. Cl.$^6$ .................................................. A01D 45/00
[52] U.S. Cl. .................................................. 56/98; 56/14.4
[58] Field of Search ........................... 56/50, 53, 94, 56/98, 60, 14.3, 14.4, 119, 113, 114

[56] References Cited

U.S. PATENT DOCUMENTS

| | | | |
|---|---|---|---|
| 3,736,734 | 6/1973 | Pavel | 56/94 X |
| 4,581,878 | 4/1986 | Vida et al. | 56/113 X |
| 4,589,250 | 5/1986 | Faul, Jr. | 56/14.4 X |

Primary Examiner—Michael Powell Buiz
Attorney, Agent, or Firm—David A. Lingbeck

[57] ABSTRACT

The sunflower harvesting attachment comprises a generally triangular-shaped blade which is attached to a blade mount having an elongated upper plate member, an elongated lower plate member, a space member fixedly attached to and separating the two plate members, and an eyelet member to which the blade is fastened. Two longitudinal grooves extend along either side of the blade mount and are defined by the two plate members and the spacer member. The sunflower harvesting attachment is fastenably inserted in the crop-gathering channel between two adjacent crop dividers or deck plates with the cutting edge of blade disposed in the direction of operationally movement of the implement head so that as the stalks of the sunflowers enter the crop-gathering channel they are severed and the sunflower portion is fed through the implement header and combine into a holding bin.

11 Claims, 2 Drawing Sheets

SUNFLOWER HARVESTING ATTACHMENT FOR CORN PICKER HEADS

BACKGROUND OF THE INVENTION

This invention relates to a sunflower harvesting attachment for corn picker heads which can be quickly and conveniently mounted between the crop dividers on corn picker heads to convert the corn picker head to a sunflower picker which harvests sunflowers.

Various types of implements are generally used to harvest different crops. There are combine heads which typically harvest wheat, oats, beans, and other types of stalkless crops, and then there are corn picker heads and other types of picker head implements which harvest corn, sunflowers, and other crops having stalks. The heads attachable to combines are generally removable and replaceable with other types of heads, some heads being used to harvest the stalkless crops and other heads being used to harvest crops having stalks. Even with interchangeable heads for combines, the cost of the interchangeable heads is quite high, and furthermore, it is not very productive to have implements which are designed to do one or two functions. It would be much more economical to have implements which can perform multiple tasks. Upon review of the prior art, none describes implements which can be easily converted to perform other related functions such as a corn picker head being converted to a sunflower harvester.

One known prior art is a SUNFLOWER HARVESTER ATTACHMENT FOR COMBINES, U.S. Pat. No. 4,255,920, which comprises a header having a plurality of reciprocating knives.

Another known prior art is an ADAPTER FOR USE WITH HARVESTING MACHINES FOR CORN AND THE LIKE, U.S. Pat. No. 5,269,126, which comprises a frame connectable to the machine, a pair of rotors, and a means to direct the crops between the rotors.

Another known prior art is a SUNFLOWER HEADER ATTACHMENT FOR COMBINE, U.S. Pat. No. 4,589,250, which comprises a frame, a plurality of sunflower pan support platforms, a plurality of tab members, and a plurality of draw fastener assemblies each having a chain, a clamp, a plurality of stop members, and a means for urging the clamp against the header platform.

Another known prior art is a SUNFLOWER HEADER ATTACHMENT, U.S. Pat. No. 4,445,314, which comprises a plurality of pans, a plurality of brackets, a plurality of adjustable pan supports, a plurality of elongated snouts, a side divider, and a reel for urging sunflowers into the combine.

Another known prior art is a MULTI-ROW ADAPTER FOR THE COMPLETE HARVESTING OF CORN OR SUNFLOWER, U.S. Pat. No. 4,581,878, which comprises the adapter having channels, cutting means, conveyors, snapping strips, stalk-gathering rolls, and a stalk guide means.

There is a definite need for a sunflower harvesting attachment which inexpensively converts a corn picker head to a sunflower harvester without needing two complete separate heads.

SUMMARY OF THE INVENTION

The present invention relates to a sunflower harvesting attachment for corn picker heads which comprises a blade, a means to support the blade for mounting upon the corn picker head, which comprises an upper plate member, a lower plate member, a spacer member fixedly interconnecting the two plate members and defining two longitudinal grooves between the two plate members, and an eyelet member fixedly connected to and extending from one end of the spacer member, the blade being pivotally attached to the eyelet member. The sunflower harvesting attachment is securely attachable with bolts to two adjacent crop dividers and is disposed between the two crop dividers with the cutting edge of the blade exposed toward the front of the header so that as the header is operationally moved, sunflower stalks are severed by the blade and the sunflowers moved into a loading bin on the combine.

One objective of the present invention is to provide a sunflower harvesting attachment for corn picker heads which can be easily and conveniently mounted upon the corn picker heads.

Another objective of the present invention is to provide a sunflower harvesting attachment for corn picker heads which allows the user to easily and quickly convert a corn picker head to a sunflower harvester.

Also, another objective of the present invention is to provide a sunflower harvesting attachment for corn picker heads which saves the user lots of money since the user doesn't have to spend money on a completely separate header to harvest sunflowers.

Yet, another objective of the present invention is to provide a sunflower harvesting attachment for corn picker heads which allows the user to effectively and productively use a corn picker head to the fullest extent possible since, otherwise, the corn picker head could not have been used if it weren't for the sunflower harvesting attachment.

Further objectives and advantages of the present invention will become more apparent as the description proceeds and when taken in conjunction with the accompanying drawings wherein:

DETAILED DESCRIPTION OF THE INVENTION

Figure 1:
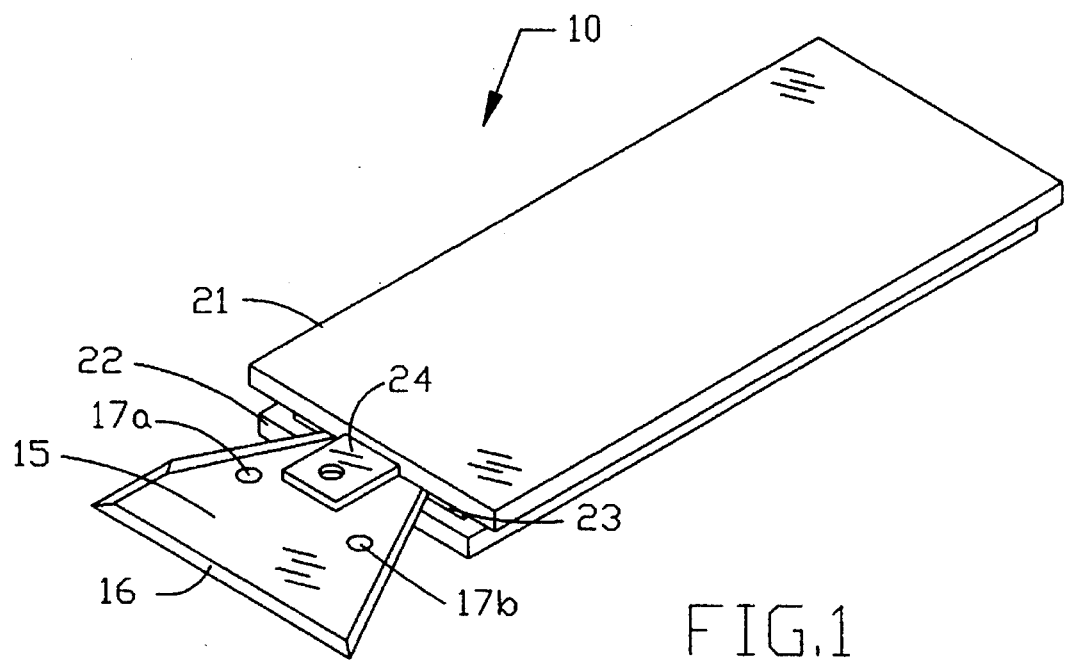
FIG. 1 is a top frontal perspective view of the sunflower, harvesting attachment.
Figure 2:
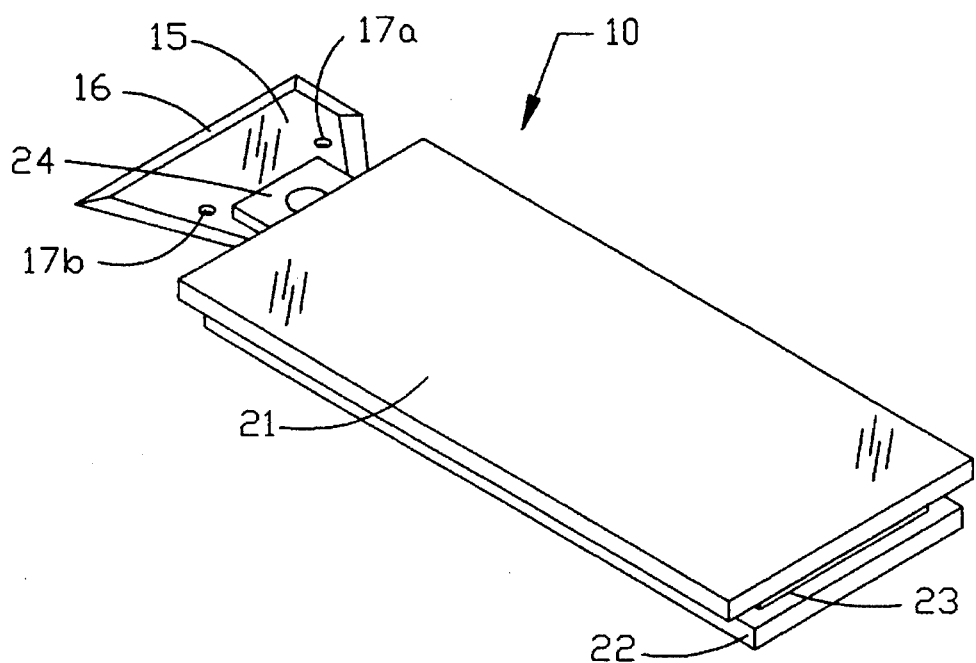
FIG. 2 is a bottom rear perspective view of the sunflower harvesting attachment.

Referring to the drawings in FIGS. 1–4, in particular, the sunflower harvesting attachment 10 for corn picker heads 30 comprises a generally triangular-shaped blade 15 having a cutting edge 16 and two mounting holes 17a & 17b therethrough and further comprises a blade mount 20 for supporting and mounting the blade 15 upon the implement head 30. The blade mount 20 includes an elongated upper plate member 21, an elongated lower plate member 22, a spacer member 23 fixedly attached or welded to and separating the two plate members 21 & 22, and an eyelet member 24 fixedly attached or welded to an end of the spacer member 23 and extending outwardly therefrom. The blade mount 20 further comprises two longitudinal grooves 25 & 26 defined by the two plate members 21 & 22 and the spacer member 23. The grooves 25 & 26 extend along the length of the sides of the blade mount 20.

Figure 3:
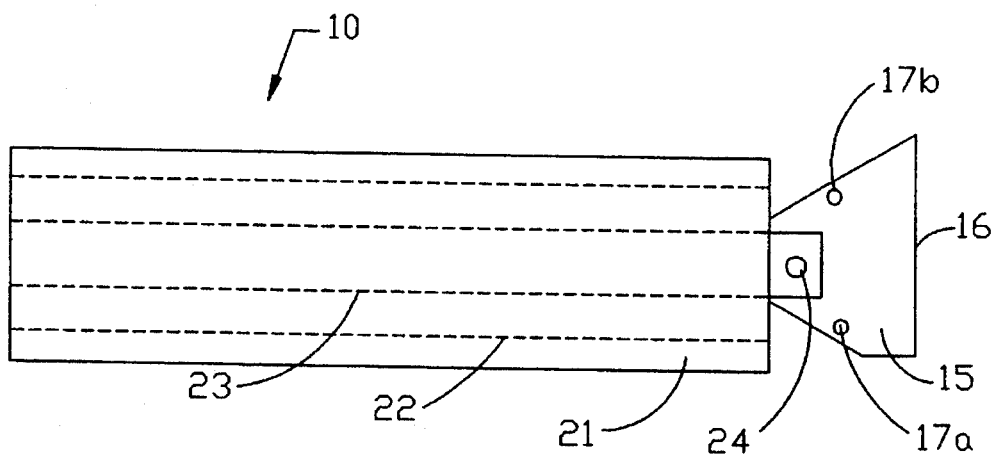
FIG. 3 is a top plan view of the sunflower harvesting attachment.

As illustrated in FIGS. 1 and 3, the blade 15 is pivotally attached with a bolt or a rivet to the eyelet member 24 with the cutting edge 16 of the blade 15 disposed outward away from the eyelet member 24. The upper plate member 21 is dimensioned generally larger than the lower plate member 22 and has longitudinal edge portions which rest or mount upon portions or longitudinal edges of two deck plates 33 & 34 of two adjacent crop dividers on the implement head 30 and essentially traverse the crop-gathering channel 35 defined by and formed between the two deck plates 33 & 34 of the adjacent crop dividers. The blade 15 is adapted to fastenably mount to the deck plates 33 & 34 and is disposed in the crop-gathering channel 35 with the cutting edge 16 disposed in the direction of operational movement of the implement header 30 to sever the stalks of the sunflowers.

Figure 4:
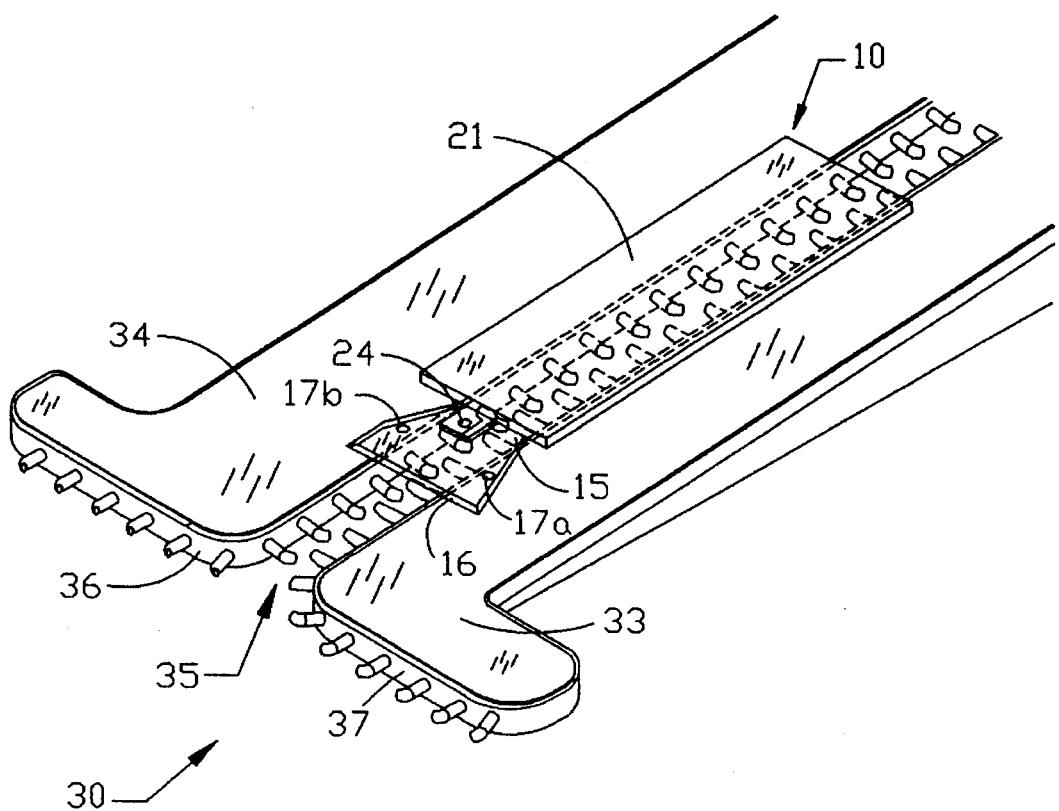
FIG. 4 is a top plan view of the sunflower harvesting attachment and a partial view of a corn picker head showing the sunflower harvesting attachment mounted to and between two crop dividers of the corn picker head.

As illustrated in FIG. 4, to convert the corn picker head 30 to the sunflower harvester, the hood on the corn picker head 30 should be opened and detached to expose the deck plates 33 & 34 which are fastened to the corn picker head 30 with bolts as such. The bolts fastening the deck plates 33 & 34 should be loosened to accommodate a plurality of sunflower harvesting attachments 10 each of which should be slid over the edges of two adjacent deck plates 33 & 34 with the blade 15 being disposed in the crop-gathering channel 35 defined by and formed by the two adjacent deck plates 33 & 34 on the crop dividers and having the cutting edge 16 thereof being disposed in the direction of operational movement of the implement head 30. The elongated upper plate member 21 of each sunflower harvesting attachment 10 which is preferably made of metal, should be disposed upward with the elongated lower plate 22 member being disposed downward. The blade mount 20 should be positioned in the crop-gathering channel 35 such that endless stalk rollers 36 & 37 which move or pass about the crop dividers and which travel through the crop-gathering channel 35, should also travel through the two longitudinal grooves 25 & 26 in the sides of the blade mount 20. The cutting edge 16 of the blade 15 should preferably be positioned approximately 1 to 1½ inches forward of the position where the adjacent endless stalk rollers 36 & 37 mesh with each other. The loosened deck plates 33 & 34 should be positioned so as to engage the blade mount 20, and the blade 15 should be securely fastened with bolts or screws inserted through the two mounting holes 17a & 17b in the blade 15 and into the two adjacent deck plates 33 & 34. The deck plates 33 & 34 should then be refastened to the implement head 30, and the hood which covers the deck plates 33 & 34 should be reattached to the implement head 30 over the deck plates 33 & 34 so that the converted sunflower harvester is in operational condition for harvesting sunflowers.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A sunflower harvesting attachment for corn picker heads comprising:

a blade; and a blade mount having an elongated upper plate member, an elongated lower plate member, a spacer member fixedly attached to and separating said plate members, an eyelet member fixedly attached to an end of said blade mount and to which said blade is pivotally attached, said blade mount further having two longitudinal grooves defined by said plate members and said spacer member and extending in opposite sides of said blade mount, for detachably mounting said blade to two adjacent deck plates on a corn picker head.

2. A sunflower harvesting attachment for corn picker heads as described in claim 1, wherein said blade is detachably fastened to said adjacent deck plates and is disposed in a crop-gathering channel formed between said adjacent deck plates for severing stalks of sunflowers.

3. A sunflower harvesting attachment for corn picker heads as described in claim 2, wherein said blade has a cutting edge which is disposed in the direction of operational movement of said corn picker head.

4. A sunflower harvesting attachment for corn picker heads as described in claim 2, wherein said elongated upper plate member is engageable to said deck plates to further support said blade in said crop-gathering channel of said corn picker head.

5. A sunflower harvesting attachment for corn picker heads as described in claim 1, wherein said longitudinal grooves are adapted to allow stalk rollers on said corn picker head to move therethrough.

6. A process of converting a corn picker head to a sunflower harvester comprises the steps of:

providing a plurality of sunflower harvesting attachments;

unfastening deck plates mounted upon said corn picker head;

positioning said sunflower harvesting attachments in crop-gathering channels defined by said deck plates; and fastening said sunflower harvesting attachments to said deck plates and refastening said deck plates to said corn picker head.

7. A process of converting a corn picker head to a sunflower harvester according to claim 6, wherein each of said sunflower harvesting attachments comprises a blade and a blade mount which includes an elongated upper plate member, an elongated lower plate member, a spacer member fixedly attached to and separating said plate members, and an eyelet member fixedly attached to an end of said blade mount and to which said blade is pivotally attached, said blade mount further includes two longitudinal grooves extending along opposite sides thereof and defined by said plate members and said spacer member.

8. A process of converting a corn picker head to a sunflower harvester according to claim 7, wherein the step of positioning said sunflower harvesting attachments further includes positioning one of said sunflower harvesting attachments in each said crop-gathering channel.

9. A process of converting a corn picker head to a sunflower harvester according to claim 8, wherein each of said sunflower harvesting attachments is positioned in said crop-gathering channels such that a cutting edge of each of said sunflower harvesting attachments is disposed in the direction of operational movement of said corn picker head.

10. A process of converting a corn picker head to a sunflower harvester according to claim 9, wherein said upper plate member of each of said sunflower harvesting attachments is engageable to said deck plates.

11. A process of converting a corn picker head to a sunflower harvester according to claim 10, wherein said longitudinal grooves are adapted to allow stalk rollers on said corn picker head to move therethrough during operation of said corn picker head.

* * * * *